United States Patent
Sharma et al.

(10) Patent No.: US 7,761,420 B2
(45) Date of Patent: Jul. 20, 2010

(54) METHOD AND SYSTEM FOR REPLICATING OBJECTS

(75) Inventors: Upendra Sharma, Haryana (IN); Tapan Kumar Nayak, New Delhi (IN); Rohit Jain, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 11/872,930

(22) Filed: Oct. 16, 2007

(65) Prior Publication Data

US 2009/0100112 A1 Apr. 16, 2009

(51) Int. Cl.
*G06F 17/00* (2006.01)
(52) U.S. Cl. ..................... 707/635; 707/638
(58) Field of Classification Search ............ 707/6–10, 707/200–206, 3
See application file for complete search history.

(56) References Cited

U.S. PATENT DOCUMENTS

| 7,120,825 | B2 | 10/2006 | Ji et al. | |
|---|---|---|---|---|
| 2006/0218363 | A1* | 9/2006 | Palapudi | 711/162 |
| 2006/0277432 | A1* | 12/2006 | Patel et al. | 714/6 |
| 2007/0143298 | A1* | 6/2007 | Surendran et al. | 707/10 |
| 2007/0185934 | A1* | 8/2007 | Cannon et al. | 707/204 |
| 2008/0147641 | A1* | 6/2008 | Leffingwell et al. | 707/5 |

* cited by examiner

*Primary Examiner*—Wilson Lee
(74) *Attorney, Agent, or Firm*—Gibb I.P. Law Firm, LLC

(57) ABSTRACT

A method and system for method for replicating object consisting of creating a group of objects at a first location; transmitting the group of objects from a first location to a second location over a network coupling the first location to the second location, such that the number of transmissions is minimized receiving the group of objects at the second location; and storing the group of objects at the second location. The objects are preferably data objects and are collated into group based on a probability score is computed for each data object centered on an access pattern. Advantages include minimizing the number of transmission of the group of objects thereby reducing network traffic and failure of operation during replication of the objects.

16 Claims, 5 Drawing Sheets

METHOD AND SYSTEM FOR REPLICATING OBJECTS

BACKGROUND OF THE INVENTION

1. Technical Field

The present invention relates to the field of object replication, and more particularly, to a redundancy technique for object replication by grouping objects based on a probability score thereby minimizing re-transmission of objects.

2. Description of the Related Art

Remote mirroring is a data redundancy technique for coping with storage system failures. A copy of data, sometimes referred to as a 'primary' or 'local' copy, is updated, for example, as it is accessed by an application program. A redundant copy of the data, sometimes referred to as a 'secondary' or 'slave' copy of the data, usually at a remote site, is updated as well. When a failure occurs that renders the primary copy unusable or inaccessible, the data can be restored from the secondary copy, or accessed directly from there.

Conventional schemes for remote mirroring tend to maintain the primary and secondary copies of the data synchronized. Thus, when a failure occurs at the primary site, data loss is minimized because the secondary copy matches the data that was stored at the primary site. However, when an error occurs that results in data corruption at the primary site, such as a software error, these schemes tend to quickly propagate the error. This results in corrupted data at the secondary site.

U.S. Pat. No. 7,120,825 describes a technique for adaptive batching for asynchronous data redundancy. A sequence of write transactions are adaptively arranged into a sequence of send batches at the first storage facility. The transactions are received at a second storage facility and applied to a redundant data copy at the second storage facility. The second storage facility may arrange the write transactions according to a sequence of receive batches. The batch sizes may be adaptively adjusted or completed. The batch sizes or adaptive completion of the batches may be based on, for example, availability of a communication medium between the first storage facility and the second storage facility. Each send batch may be forwarded to the second storage facility upon completion.

Replication of data-objects from a source location to a destination location over any communication network/protocol has a number of constraints, some of which are indicated. First, the objects are active, in the sense that the objects are being dynamically updated; for e.g. active files in a file system. Second, at any point-in-time image of the objects is not possible. Third, one or more object(s) are grouped together and these groups are the logical units of work. Fourth, the complete operation at the group level is atomic. Typically, such an operation involves i.) Reading from source location. ii.) Transfer of data over the network to destination location iii.) Storage of data on the destination location. And, any change/update in the characteristics of any of the component-objects of a group would mean a complete restart of the whole of the group-operation. Several other constraints may be applied during the replication process. The prior art suffers from a disadvantage with retransmission of whole group of objects in case of any change/update of any component objects within a group of objects. A further disadvantage is that the replication would interfere either with the filesystem or require its operations to be shut down.

Without a way to provide an improved method of replicating objects on a communication network and reducing failure of operations during replication the promise of this technology may never be fully achieved.

SUMMARY

A system and method for replicating object consisting of creating a group of objects at a first location; transmitting the group of objects from a first location to a second location over a network coupling the first location to the second location, such that the number of transmissions is minimized receiving the group of objects at the second location; and storing the group of objects at the second location. The objects are preferably data objects and are collated into group based on a probability score is computed for each data object centered on an access pattern. Advantages include minimizing the number of transmissions of the group of objects thereby reducing network traffic and failure of operation during replication of the objects. Other embodiments are also disclosed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
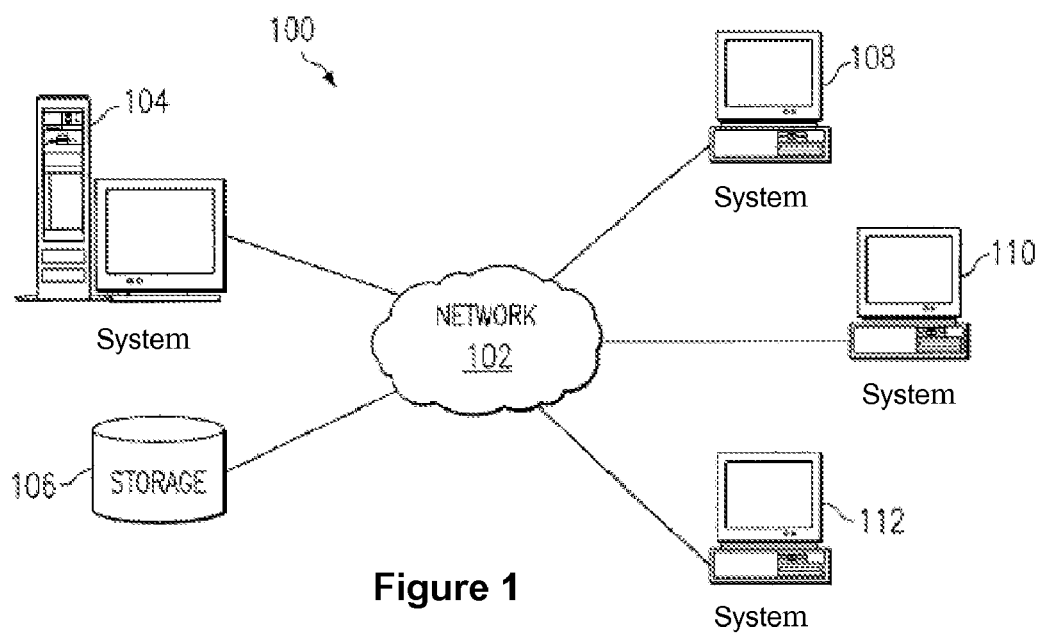
FIG. 1 depicts an exemplary embodiment of a network of data processing system in which the present invention may be implemented.

FIG. 1 depicts an exemplary embodiment of a pictorial representation of a system 100 consisting of a number of computing devices coupled over a network 102 in which the present invention may be implemented. The system 100 is a network of computers in which the present invention may be implemented, contains a network 102, which is the medium used to provide communications links between various devices and computers connected together within system 100. Network 102 may include connections, such as wire, wireless communication links, or fiber optic cables or a combination thereof.

In one embodiment of the depicted example, the system 100 can consist of server(s) 104 is connected to network 102 along with storage unit 106, the storage unit can be coupled to the server or may function as an independent unit over the network consisting of the relevant hardware elements such as a processor, memory, network interface cards etc. In addition, a number of devices (herein after referred to as clients) 108, 110, and 112, which may be dumb terminals coupled to the server 104 or other devices that can compute independently are also connected to network 102. These clients 108, 110, and 112 may be, for example, personal computers, laptop computers, network computers, personal digital assistants, mobile phone and the like. In the depicted example, in one embodiment, the server 104 provides data, such as boot files, operating system images, and applications to clients 108, 110, 112. Clients 108, 110, and 112 are coupled to server 104, specifically in the case of a client-server architecture. The system 100 may include additional servers, clients, and other devices, such as PDA's for example which are not shown in FIG. 1.

In one embodiment of the depicted example, the system 100 is coupled to the Internet with network 102 representing a worldwide collection of networks and gateways that use the TCP/IP suite of protocols to communicate with one another. At the heart of the Internet is a backbone of data communication lines, preferably high-speed, between major nodes or host computers forming the system 100, consisting of thousands of commercial, government, educational and other computer systems that route data and messages. Of course, the system 100 also may be implemented as a number of different types of networks, such as for example, an intranet, a local area network (LAN), or a wide area network (WAN). FIG. 1 is intended as an example and not as an architectural limitation for the present invention and should be obvious to a person skilled in the art that various other implementation of this system fall within the scope of the present invention.

In one embodiment of the depicted example, the replication of objects may be performed between the one of the client 108 and the server 104 or another client 110, 112 or the storage 106. In accordance with the present invention, a first location is identified on the client 108. A group of objects is created on the first location in client 108 and are required to be replicated. This group of objects is transmitted from the first location on client 108 to a second location on a server 104, where the first location and the second location are coupled over a network 102. The objective here is to minimize the number of transmissions between the first location and the second location. The group of objects is received at a second location and stored at the second location on the server 104, thereby replicating the group of objects over a network.

An advantage with grouping reduces the server metadata update load and improves the data-storage performance (for e.g. if 512 objects, each of size 1 Kbytes, are grouped together then a single metadata update will be performed instead of 512 updates. Besides this if the block-size of the storage device on the server end is, say 512 KB, then all 512 files can be stored in a single write operation in a single block instead of 512 blocks). However, groups are created in an order which is independent of update probabilities of the objects/files. If any of the component objects/files are updated during the backup, the complete group suffers a retransmission. This could cause a large overhead. Advantageously, the present invention which could group the objects (files) such that the number of retransmissions is reduced, would enhance the performance of the solution.

The software may be stored in a computer readable medium, including the storage devices described below, for example. The software is loaded into the computer system (computing devices) from the computer readable medium, and then executed by the computer system. A computer readable medium having such software or computer program recorded on it is a computer program product. The use of the computer program product in the computer system preferably effects an advantageous apparatus for performing the method as implemented by the present invention. Further, the method of the present invention consists in receiving a data signal containing functional requirements from a readable medium, the data signal when executed on a processor capable of performing the method as described within the scope of the present invention.

Figure 2:
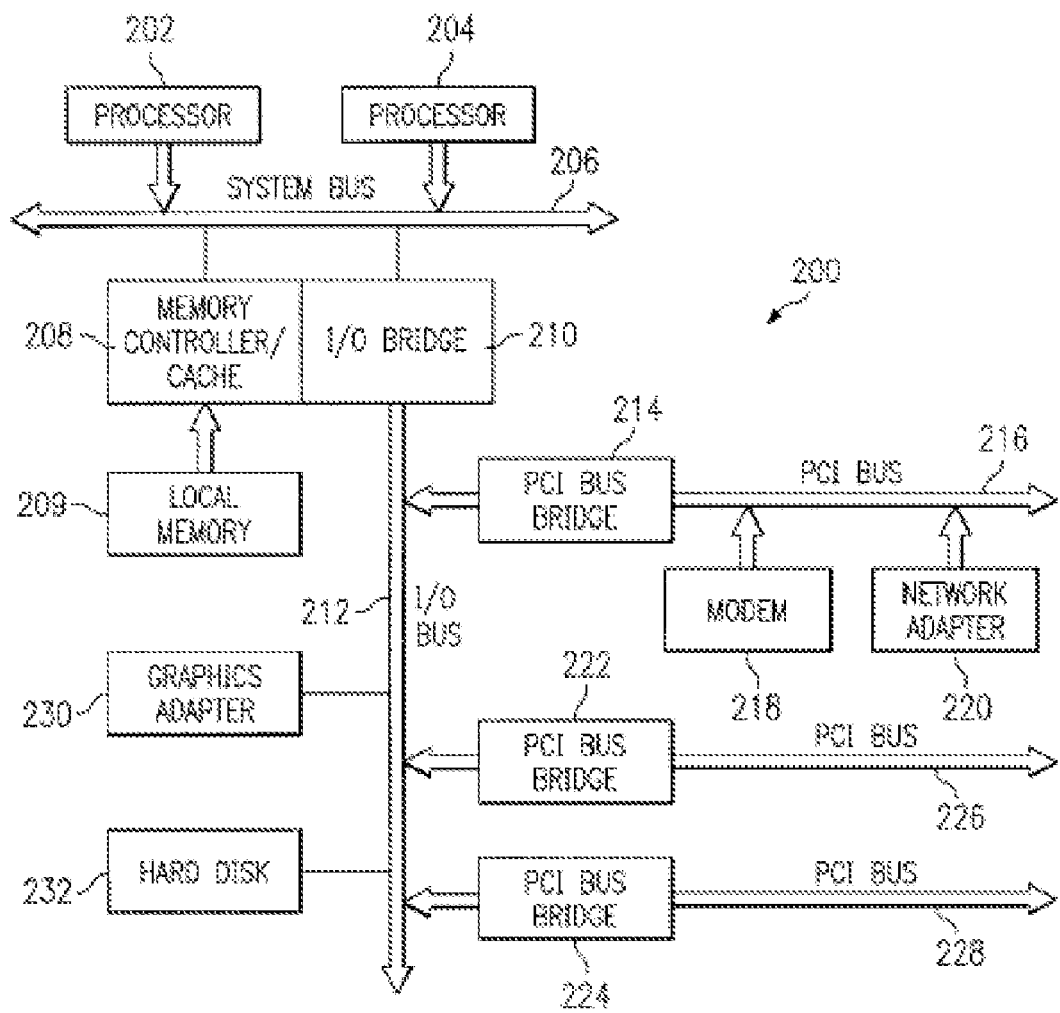
FIG. 2 is an exemplary embodiment of a block diagram illustrating a data processing system that may be implemented as a server in which the present invention may be implemented.

Referring to FIG. 2, an exemplary embodiment of a block diagram illustrating a system/device that may be implemented as a server 104 or the storage device 106 of FIG. 1 in which the present invention may be implemented is depicted in accordance with a preferred embodiment of the present invention. The system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

The software may be stored in a computer readable medium, including the storage devices described below, for example. The software is loaded into the computer system from the computer readable medium, and then executed by the computer system. A computer readable medium having such software or computer program recorded on it is a computer program product. The use of the computer program product in the computer system preferably effects an advantageous apparatus for performing the method as implemented by the present invention. Further, the method of the present invention consists in receiving a data signal containing functional requirements from a readable medium, the data signal when executed on a processor capable of performing the method as described within the scope of the present invention.

Figure 3:
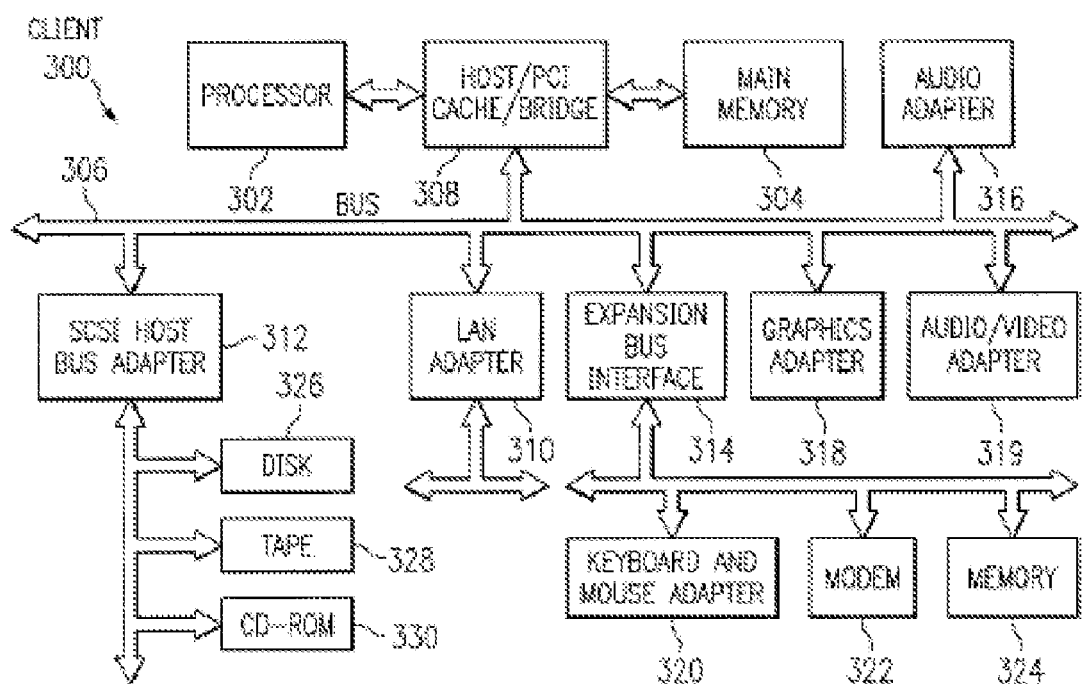
FIG. 3 is an exemplary embodiment of a block diagram illustrating a data processing system that may be implemented as a client computer in which the present invention may be implemented.

FIG. 3 is an exemplary embodiment of a block diagram illustrating a system is depicted in which the present invention may be implemented. The system 300 is an example of a client computer 108-112. Small computer system interface (SCSI) host bus adapter 312 provides a connection for hard disk drive 326, tape drive 328, and CD-ROM drive 330. Typical PCI local bus implementations will support three or four PCI expansion slots or add-in connectors. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent non-volatile memory) or optical disk drives and the like, may be used in addition to or in place of the hardware depicted in FIG. 3. Also, the processes of the present invention may be applied to a multiprocessor data processing system.

A further example of the data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, mobile phone etc., which is configured with ROM and/or flash ROM in order to provide non-volatile memory for storing operating system files and/or user-generated data. The depicted example in FIG. 3 and above-described examples are not meant to imply architectural limitations. For example, data processing system 300 also may be a notebook computer or hand held computer in addition to taking the form of a PDA. In one embodiment, the data processing system 300 also may be a kiosk or a Web appliance.

Figure 4:
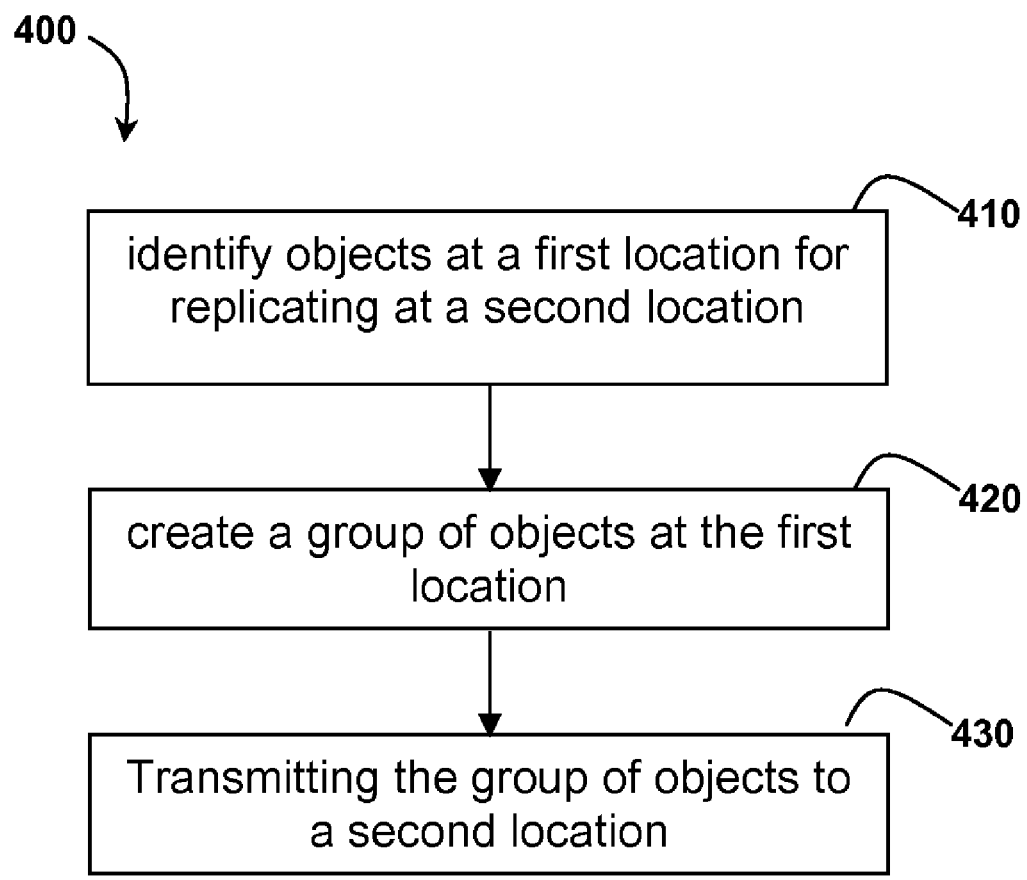
FIG. 4 is an exemplary embodiment of a method 400 for replicating objects in accordance with the present invention.

FIG. 4 illustrates an exemplary embodiment of a method 400 of replicating objects in accordance with the present invention. In step 410, on the first location, objects that need to be replicated at a second location are identified. In step 420, objects are grouped together. Preferably the objects are data objects such as, for example, files. The grouping of the objects is performed based on a computed probability score for each of the objects at the first location, and objects are then grouped based on the probability score. In one embodiment, the probability score is computed by monitoring the access patterns of the objects over a given period of time, which may be pre-defined. In one embodiment, for example, the access pattern can be extracted by recording the access timestamp and the access type associated with each object. In a further embodiment, the grouping of the objects based on the probability score may be defined by the user or on some other pre-defined criteria. Once the objects have been grouped based on the probability score, in step 430, the group of objects is transmitted from a first location (for example a client 108 of FIG. 1) to a second location (for example a server 104 of FIG. 1), wherein the second location can be chosen by the user or may be pre-defined or may be automatically determined based on historical data that may be recorded on the system.

Figure 5:
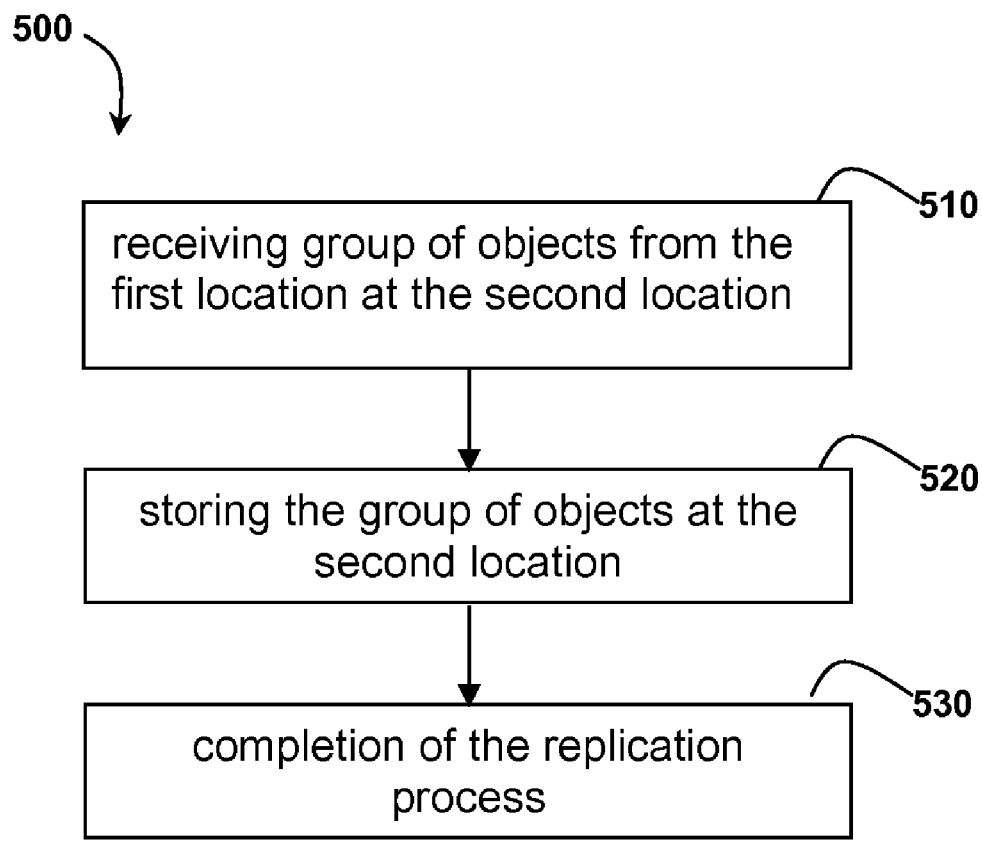
FIG. 5 illustrates an exemplary embodiment of a method 500 for replicating objects in accordance with the present invention.

FIG. 5 illustrates an exemplary embodiment of method 500 of replicating objects in accordance with the present invention. In step 510, the objects that are transmitted from the first location are received at the second location. After receiving the group of objects at the second location, the system may perform a consistency check in one embodiment. Subsequently, in step 520, the group of objects is stored on the second location, and in step 530 the replication process is completed after performing another check that the group of objects that were received have been stored in a desired manner. On completion of the replication of the group of objects between the first location and the second location, the first location is intimated by the second location that replication has successfully occurred.

As discussed previously, the present invention proposes a technique which would group Objects, for example in case of a file-system it would be files, leveraging their update probabilities, in a manner such that the chance or probability of retransmission of the group is minimized. An advantage of the present invention is that the number of failures of an atomic operation before its eventual success is improved to a relatively large extent. Let, each object in the system be defined by an update/change probability which can be modeled by observing the workload on a host system over a period of time. Object-update probability, which is obtained from the statistics gathered from the host system, is used for grouping the objects together in such a manner that the total number of atomic transmissions is minimized.

The algorithm for performing the grouping of objects is defined below: Let

1. N be the total number of objects for backup
2. $p_i$ be the update probability of an object i while the atomic operation is in progress, i=1,2, . . . , N. Assume that the object's update probability remains unchanged during the operation and is independent of update probabilities of other objects.
3. $s_i$ be the size (in bytes) of an object i, i=1,2, . . . , N.

4. $N_G$ denotes the number of groups of objects or batches for transmission.
5. Let a denotes the occupancy matrix. If object i is in batch j, j=1,2, ..., $N_G$, $a_{ij}$=1 else $a_{ij}$=0
6. $b_j$=1, if batch j is non-empty, else 0.

Hence the expected number of atomic transmissions for successful replication of N objects may be computed using the formula $$N_T = \sum_{j=1}^{N_G} \frac{b_j}{\prod_{i=1}^{N} (1-p_i)^{a_{ij}}} \qquad 1$$

Identifying the occupancy matrix a so as to minimize the expected number of transmissions $N_T$ subject to the constraints, is required with the assumptions that.
1. The number objects within a group are never more than a fixed number (TXNGROUPMAX)
2. The sum of size of all objects in a group must never be more than a fixed threshold (TXNBYTELIMIT).

The objective function is therefore computed using the formula:

$$\min N_T = \sum_{j=1}^{N_G} \frac{b_j}{\prod_{i=1}^{N}(1-p_i)^{a_{ij}}} = \sum_{j=1}^{N_G} b_j \exp\left(\sum_{i=1}^{N} a_{ij} \log \frac{1}{1-p_i}\right) \qquad 2$$

The objective function computed using the formula of Eq. (2) are subject to the mathematical constraints $$\sum_{i=1}^{N} a_{ij} s_i \leq TXNBYTELIMIT, \forall\ j = 1, 2, \ldots, N_G, \qquad 3$$

$$\sum_{i=1}^{N} a_{ij} \leq TXNGROUPMAX, \forall\ j = 1, 2, \ldots, N_G, \qquad 4$$

$$\sum_{j=1}^{N_G} a_{ij} = 1, \forall\ i = 1, 2, \ldots, N, \qquad 5$$

$$a_{ij} \leq b_j, \forall\ i = 1, 2, \ldots, N, j = 1, 2, \ldots, N_G, \qquad 6$$

$$a_{ij} \in \{0, 1\}, b_j \in \{0, 1\}, \forall\ i, j. \qquad 7$$

where $$\max\left(\frac{N}{TXNGROUPMAX}, \frac{\sum_{i=1}^{N} s_i}{TXNBYTELIMIT}\right) \leq N_G \leq N. \qquad 8$$

This is an example of mixed integer nonlinear program or MINLP. Although some efficient algorithms are known for solving nonlinear programs (NLPs), no efficient algorithm is known for solving arbitrary MINILPs. Hence a heuristic that provides a good solution and enhances the speed significantly is implemented, requiring small computing resources and therefore also suitable for implementation on mobile devices.

The objective of the algorithm is to group objects in a manner such that the total number of transmissions is close to minimum. To achieve, group the objects in such a way that all the groups will satisfy the constraints Eq. 3-7 and the expected numbers of retransmissions for each group are close to equal. Moreover, it is ensured that splitting of any group will not result in a better solution. Initialization is performed in accordance with the following rules:
1) Initialize $N_G$ with the number of groups required in the above algorithm, say $N_G^0$.
2) Sort the objects in descending order of update probabilities.
3) Under each group, hold two different baskets and a new object to a group will be added to either of the baskets.

Once initialization is completed, then candidate object selection for each Group/Basket is performed in accordance with the following rules:

For each object in the sorted sequence, follow the following steps illustrated below.
1) Select a set of candidate groups that can accommodate the new object as following:
   a. The number of objects in the group, including the new object, is not greater than TXNGROUPMAX.
   b. The total size of all the objects in the group, including the new object, is less than TXNBYTELIMIT.
   c. For each basket in the group, multiply the no_update_probability (no_update_probability=1−update_probability) of all the objects belonging to that basket. Put the new object in the basket with larger product. Re-compute the products. If the sum of the products is larger than unity then add the group to the candidate-group-list. If the sum is less than one, splitting the group into two different groups, each having one basket, would result less number of transmissions, and is thus not suitable as a candidate group.
2) Once the candidate groups are selected, choose the best candidate group as following: Compute the product of no_update_probability of all the objects of a group and select the group which has maximum product. The inverse of the product represents the expected number of transmissions required for eventual success of a group operation. Hence a group is selected as the best candidate which requires minimum number of retransmissions. The group can be selected by using the formula $$\arg\max_{j \in Candidate\ List} \prod_{i \in Group\ j} (1-p_i) \qquad 9$$

Once the group is selected, put the new object in the basket with larger product.
3) If the candidate set is empty, create a new group and put the new object in the new group.

This will result a suitable partition of the objects with $N_G^0$ or more groups, if the candidate set of some object was null. But a lower value of $N_G$ may result in less number of transmissions, because merging and rearrangement of groups may improve the performance. Iterate on different values of $N_G$ and then select the best solution. Ideally, if we compute for all possible values of $N_G$, within upper and lower limits, the best performance can be achieved, however, it may be computation intensive for large systems. Hence, choosing a search region with some amount of built in intelligence with a simple heuristic proves effective. Start with $N_G^0$ and continue with $N_G$:=$N_G$−1, till $N_G$ reaches the lower bound or it finds some null candidate set, so that it requires more number of groups to accommodate all the objects.

Applicability includes backup/archive data sent to backup server storage is sent as a transaction, which means that not every object is sent to the server separately; instead objects are bunched together into a group which conforms to following two limits:

1. Size of the transaction (object-bunch) should not be more than a threshold which is set by a configurable parameter, TXNBYTELIMIT in the case of IBM® Tivoli Storage Manager
2. Number of objects bunched in the transaction should not be more than a configurable parameter, TXNGROUP-MAX in the case of Tivoli Storage Manager.

Backup server combines multiple objects in one transaction to reduce the transaction overhead and to increase performance. A single transaction is an atomic action, the smallest possible unit of work. Data sent within the bounds of a transaction is either committed completely to the system at the end of the transaction, or it is all rolled back if the transaction is ended prematurely. When the backup client observes that a object, being sent under the bounds of a transaction, has changed while being backed-up and decides to resend the changed object, it is forced to resend whole of the transaction data again, instead of sending only the changed object. This would severely reduce the efficiency and success rate of backup process, especially in an environment where the small objects are being accessed for backup while they are being modified also. This invention will provide a non-intrusive solution, i.e. wise grouping of objects for creating object-bunch (or transactions), which would minimize (statistically) the number of retrials/retransmissions and maximizing successful backup process.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

While particular embodiments of the present invention have been shown and described, it will be obvious to those skilled in the art that, based upon the teachings herein, that changes and modifications may be made without departing from this invention and its broader aspects. Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for replicating objects, the method comprising:

creating groups of objects for transmitting at a first location by a computing device; and transmitting the groups of objects from said first location to a second location over a network coupling the first location to the second location by said computing device, such that a number of transmissions is minimized, wherein each of said groups of objects satisfy the following constraints:

$$\sum_{i=1}^{N} a_{ij} s_i \leq TXNBYTELIMIT, \forall\ j = 1, 2, \ldots, N_G, \tag{1}$$

$$\sum_{i=1}^{N} a_{ij} \leq TXNGROUPMAX, \forall\ j = 1, 2, \ldots, N_G, \tag{2}$$

$$\sum_{j=1}^{N_G} a_{ij} = 1, \forall\ i = 1, 2, \ldots, N, \tag{3}$$

$$a_{ij} \leq b_j, \forall\ i = 1, 2, \ldots, N,\ j = 1, 2, \ldots, N_G,\ \text{and} \tag{4}$$

$$a_{ij} \in \{0, 1\}, b_j \in \{0, 1\}, \forall\ i, j, \tag{5}$$

wherein N is a total number of objects for transmission, wherein $s_i$ is a size in bytes of an object, wherein $N_G$ is a number of groups of objects for transmission, wherein a is an occupancy matrix, where object i is in group j, wherein $b_j=1$, if batch j is non-empty, else 0, wherein TXNBYTELIMIT equals the sum of all objects in a group less than or equal to a fixed threshold, wherein TXNGROUPMAX equals the number of objects within a group less than or equal to a fixed number; and wherein an expected number of atomic retransmissions for each of said groups of objects are substantially equal.

2. The method of claim 1, further comprising:
receiving the groups of objects at the second location; and
storing the groups of objects at the second location by said computing device, thereby completing the replication process.

3. The method of claim 1, wherein the groups of objects includes data objects.

4. The method of claim 1, wherein a probability score computed by said computing device for each data object is based on an object update/change probability value for each object.

5. The method of claim 4, further comprising:
monitoring access patterns of the data object over a period of time by said computing device, wherein the access patterns are extracted by recording an access timestamp and an access type of the data object.

6. The method of claim 5, wherein the grouping the data objects based on the probability score is defined by the user.

7. The method of claim 4, wherein the grouping of the data objects on their probability score is defined based on predefined criteria.

8. A system comprising a processor;
a computer readable medium coupled to the processor; and
computer code encoded in the computer readable medium and executable by the processor to cause the processor to:
create groups of objects for transmitting at a first location;
transmit the groups of objects from said first location to a second location over a network coupling the first location to the second location, such that a number of transmissions is minimized,
wherein each of said groups of objects satisfy the following constraints:

$$\sum_{i=1}^{N} a_{ij} s_i \leq TXNBYTELIMIT, \forall\ j = 1, 2, \ldots, N_G, \quad (1)$$

$$\sum_{i=1}^{N} a_{ij} \leq TXNGROUPMAX, \forall\ j = 1, 2, \ldots, N_G, \quad (2)$$

$$\sum_{j=1}^{N_G} a_{ij} = 1, \forall\ i = 1, 2, \ldots, N, \quad (3)$$

$$a_{ij} \leq b_j, \forall\ i = 1, 2, \ldots, N,\ j = 1, 2, \ldots, N_G,\ \text{and} \quad (4)$$

$$a_{ij} \in \{0, 1\}, b_j \in \{0, 1\}, \forall\ i, j, \quad (5)$$

wherein N is a total number of objects for transmission,
wherein $s_i$ is a size in bytes of an object,
wherein $N_G$ is a number of groups of objects for transmission,
wherein a is an occupancy matrix, where object i is in group j,
wherein $b_j=1$, if batch j is non-empty, else 0,
wherein TXNBYTELIMIT equals the sum of all objects in a group less than or equal to a fixed threshold,
wherein TXNGROUPMAX equals the number of objects within a group less than or equal to a fixed number, and
wherein an expected number of atomic retransmissions for each of said groups of objects are substantially equal.

9. The system of claim 8, wherein said computer code further causes said processor to:
receive the groups of objects at the second location; and
store the groups of objects at the second location.

10. The system of claim 9, wherein the groups of objects includes data objects.

11. The system of claim 10, wherein a probability score computed for each data object is based on an object update/change probability value for each object.

12. The system of claim 11, wherein the data objects are collated into groups based on their probability score.

13. The system of claim 11, wherein access patterns of the data object are monitored over a period of time, the access patterns can be extracted by recording an access timestamp and an access type of the data object.

14. The system of claim 12, wherein the grouping the data objects based on the probability score is defined by the user.

15. The system of claim 12, wherein the grouping the data objects on their probability score defined by the system based on predefined criteria.

16. A computer storage medium readable by a computer tangibly embodying a program of instructions executable by said computer for performing a method comprising:
creating groups of objects at a first location; and
transmitting the groups of objects from said first location to a second location over a network coupling the first location to the second location, such that a number of transmissions is minimized,
wherein each of said groups of objects satisfy the following constraints:

$$\sum_{i=1}^{N} a_{ij} s_i \leq TXNBYTELIMIT, \forall\ j = 1, 2, \ldots, N_G, \quad (1)$$

$$\sum_{i=1}^{N} a_{ij} \leq TXNGROUPMAX, \forall\ j = 1, 2, \ldots, N_G, \quad (2)$$

$$\sum_{j=1}^{N_G} a_{ij} = 1, \forall\ i = 1, 2, \ldots, N, \quad (3)$$

$$a_{ij} \leq b_j, \forall\ i = 1, 2, \ldots, N,\ j = 1, 2, \ldots, N_G,\ \text{and} \quad (4)$$

$$a_{ij} \in \{0, 1\}, b_j \in \{0, 1\}, \forall\ i, j, \quad (5)$$

wherein N is a total number of objects for transmission,
wherein $s_i$ is a size in bytes of an object,
wherein $N_G$ is a number of groups of objects for transmission,
wherein a is an occupancy matrix, where object i is in group j,
wherein $b_j=1$, if batch j is non-empty, else 0,
wherein TXNBYTELIMIT equals the sum of all objects in a group less than or equal to a fixed threshold,
wherein TXNGROUPMAX equals the number of objects within a group less than or equal to a fixed number, and
wherein an expected number of atomic retransmissions for each of said groups of objects are substantially equal.

* * * * *